(12) United States Patent
Ariav et al.

(10) Patent No.: US 11,861,742 B2
(45) Date of Patent: Jan. 2, 2024

(54) BI-DIRECTIONAL REAL-TIME TAB CONTROL

(71) Applicant: NCR Voyix Corporation, Atlanta, GA (US)

(72) Inventors: Gal Ariav, Ein Vered (IL); Yehoshua Zvi Licht, Alpharetta, GA (US)

(73) Assignee: NCR Voyix Corporation, Atlanta, GA (US)

( * ) Notice: Subject to any disclaimer, the term of this patent is extended or adjusted under 35 U.S.C. 154(b) by 445 days.

(21) Appl. No.: 15/274,978

(22) Filed: Sep. 23, 2016

(65) Prior Publication Data

US 2018/0089769 A1   Mar. 29, 2018

(51) Int. Cl.
  *G06Q 50/12*   (2012.01)
  *G06Q 20/20*   (2012.01)
  *G06Q 30/06*   (2023.01)
  *H04W 4/14*   (2009.01)
  *G06Q 30/0601*   (2023.01)

(52) U.S. Cl.
  CPC ........... *G06Q 50/12* (2013.01); *G06Q 20/202* (2013.01); *G06Q 30/0635* (2013.01); *H04W 4/14* (2013.01)

(58) Field of Classification Search
  CPC .. G06Q 50/12; G06Q 20/202; G06Q 30/0635; H04W 4/14
  USPC .......................................................... 705/15
  See application file for complete search history.

(56) References Cited

U.S. PATENT DOCUMENTS

| | | | | |
|---|---|---|---|---|
| 8,463,645 B1* | 6/2013 | Boyle | ................ | G06Q 30/0236 |
| | | | | 705/14.27 |
| 8,799,083 B1* | 8/2014 | Silver | .................... | G06Q 30/02 |
| | | | | 705/26.1 |
| 9,266,017 B1* | 2/2016 | Parker | ...................... | A63F 13/65 |
| 9,747,651 B2* | 8/2017 | McNally | ................ | G06Q 10/02 |
| 2003/0078793 A1* | 4/2003 | Toth | ........................ | G06Q 30/02 |
| | | | | 705/15 |
| 2012/0041903 A1* | 2/2012 | Beilby | ................... | G06N 20/00 |
| | | | | 706/11 |
| 2012/0221421 A1* | 8/2012 | Hammad | ............... | G06Q 10/00 |
| | | | | 705/16 |
| 2014/0188637 A1* | 7/2014 | Balasubramaniam | | ...................... |
| | | | | G06Q 50/12 |
| | | | | 705/15 |
| 2015/0186863 A1* | 7/2015 | Schwalb | ................ | G06Q 20/24 |
| | | | | 705/44 |
| 2015/0281166 A1* | 10/2015 | Woo | ...................... | H04L 51/046 |
| | | | | 709/206 |
| 2015/0287006 A1* | 10/2015 | Hunter | ................... | G06Q 20/32 |
| | | | | 705/21 |
| 2016/0292797 A1* | 10/2016 | Tucker | ............... | G06Q 30/0635 |
| 2017/0032478 A1* | 2/2017 | Kraft | .................... | G06Q 20/202 |
| 2017/0278150 A1* | 9/2017 | Tucker | ................... | H04W 4/02 |
| 2019/0334841 A1* | 10/2019 | Gau | ...................... | G06Q 30/016 |

FOREIGN PATENT DOCUMENTS

WO   WO-2004095728 A1 *   11/2004   ........... G06Q 20/204

* cited by examiner

*Primary Examiner* — Ariel J Yu
*Assistant Examiner* — Denisse Y Ortiz Roman
(74) *Attorney, Agent, or Firm* — Schwegman Lundberg Woessner, P.A.

(57) ABSTRACT

A user-operated device is assigned a unique tab number. The unique tab number is associated with an open order of a user. An interface is provided to the user-operated device for the user to control in real time the open order.

4 Claims, 4 Drawing Sheets

BI-DIRECTIONAL REAL-TIME TAB CONTROL

BACKGROUND

Opening a tab is a common exercise for even goers to handle their orders in a simple and hassle free manner. For example, a patron hand delivers a credit card to a waiter and proceeds to order items from the venue. While this makes the exercise hassle free, it also takes real-time control of the tab away from the patron. Thus, if the patron opened the tab for a large party, the final bill can be substantial. Moreover, trying to work out the details as to who ordered what and have the individuals in the party pay for their shares becomes a significant issue for the patron.

Additionally, oftentimes the venue can be experiencing heavy customer traffic, such that locating the waiter to close the bill can be frustrating and inconvenient, leading to customer frustration and potentially a reduction in tip for the waiter, who up until the bill was due was an outstanding waiter.

Worse yet, the patron may just leave the venue without paying the bill, which means the venue or the waiter is stuck with the bill.

SUMMARY

In various embodiments, methods and a system for a bi-directional real-time tab control are presented.

According to an embodiment, a method for providing bi-directional real-time tab control is presented. Specifically, and in one embodiment, a unique tab number is delivered to a user-operated device. Next, the unique tab number is assigned to an open order of a user. Finally, an interface is provided to the user-operated device for controlling the open order.

DETAILED DESCRIPTION

Figure 1:
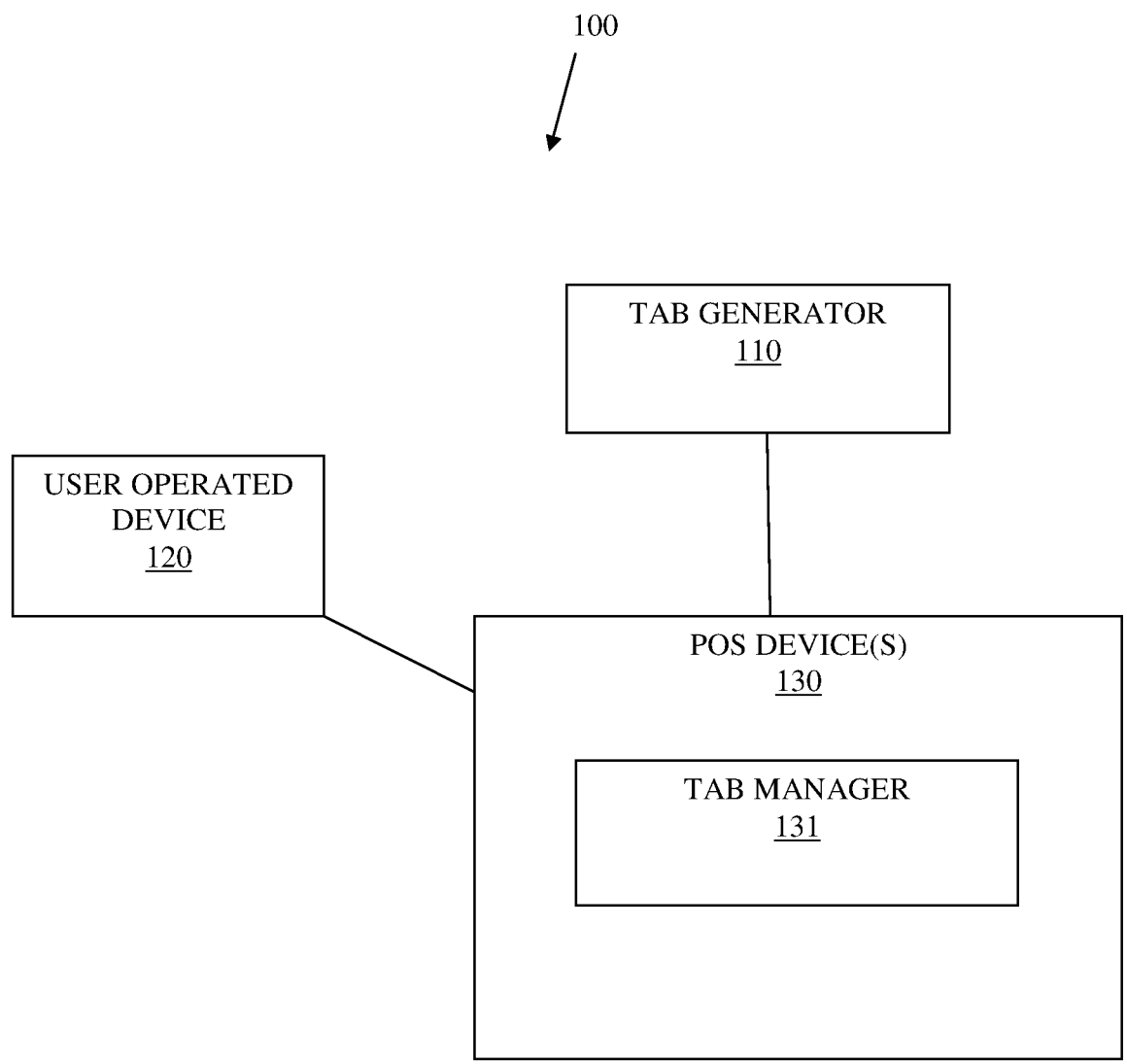
FIG. 1 is a diagram of a system for providing bi-directional real-time tab control, according to an example embodiment.
embodiment.

FIG. 1 is a diagram of a system for providing bi-directional real-time tab control, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the bi-directional real-time tab control presented herein and below.

Moreover, various components are illustrated as one or more software modules, which reside in non-transitory storage and/or hardware memory as executable instructions that when executed by one or more hardware processors perform the processing discussed herein and below.

The techniques, methods, and systems presented herein and below for providing bi-directional real-time tab control can be implemented in all, or some combination of the components shown in different hardware computing devices having one or more hardware processors.

The system 100 includes: a tab generator 110, a user-operated device 120, and one or more POS devices 130. The POS device(s) include a tab manager 131.

The tab generator 110 can be processed on a server, in a cloud, or one of the POS devices 130.

The POS device(s) 110 can be one or more of: POS servers and POS terminals. The tab manager 131 is under the control or accessible at least one of the POS devices 130.

In an embodiment, the tab generator 110 and the tab manager 131 are a same processing module or located and processed on a same POS device 110.

The user-operated device 120 can include any of: a mobile phone, a wearable processing device, a tablet, and a laptop.

During operation, the user operated device 120 is operated by a user. When the user enters a venue, such as a bar or a restaurant with user-operated device 120, the user obtains a unique tab number or unique tab token. The can be obtained by the user through the user-operated device 120 in a number of manners.

The user operated the device 120 to scan a Quick Response (QR) code displayed in the venue (at the entrance, on tables, and the receptions desk, etc.). The user-operated device 120 opens a browser in response to the scanning (by a camera of the mobile device). The website provides a connection to the tab generator 110. The tab generator or web-page presents a unique number and, perhaps, a phone number associated with communications to the tab manager 131. The user then texts the unique tab number to the number associated with the tab manager 131. This opens an order with the venue and associates the unique number with a tab transaction for the customer. When the text is received by the tab manager 131, the number to the device 120 is known the tab manager 131 as well (as the sender of the unique tab number).

Alternatively, the user simply texts a blank message to the venue number, which is received by the tab generator 110 and the tab manager 130 and a unique number is returned to the user on the device 120 as a return text. A tab transaction number is associated therewith by the tab manager 131.

In another instance, the scanned QR code is placed on tables at the venue, such that when the device 120 is redirected from the scan and a unique tab number is displayed, the tab number includes a table number as part of the unique tab number such as an appended table number for the venue as the last predefined number of digits for the unique tab number. In this case, the order number and tab number association also is associated with a particular table within the venue.

In still another instance, the waiter provides a tab number to the user upon seating the user and/or the user's party. In this case, as part of the POS software of the venue when the waiter opens or seats a patron the POS software interacts with the tab generator 110 and/or tab manager 131.

In yet another circumstance, a beacon transmitting wireless signals through WiFi, Bluetooth®, or Low Energy Bluetooth®. A customized mobile application operating on the device 120 detects the signal upon entering the venue and automatically contacts the tab generator 110 for obtaining the unique tab number and automatically notifies the tab manager 131 of the unique tab number or instructs the user to text the unique tab number to the tab manager 131.

Once the unique tab number is known and made available (through automated action, waiter action, or user action), the tab number needs associated with the user's order. This can be done by the user communicating the tab number to the waiter, or by the waiter scanning the tab number as a QR code from the display of the device 120.

In fact, a variety of other manners are possible for the user to obtain the tab number and for the tab manager 131 to become aware of the tab number.

Now when the waiter begins processing ordered items from the venue and enters the orders into the POS ordering system, the tab manager maintains the orders, such that the user can operate the device 120 to receive updates and a running total for the order through the device 120 as texts or as information communicated over a website or a customized mobile application. All of these connection and reporting mechanisms interface, in some manner, wireless with the tab manager 131. The interfaces may also permit the user to place additional orders, issues commands for details on the current tab bill, transfer a portion of the tab to another open tab, set a tab limit that is not to be exceeded, set notifications to close at the tab at a predefined time, set notifications to receive when the tab is within a user-defined percent or among of a set tab limit, transfer a portion of the tab to a newly created and opened tab, transfer the tab to a different order opened within the venue (such as when the user is in a bar and wants to transfer the tab to the restaurant when his/her seat becomes available for seating in the restaurant), and close out the tab and/or pay for the tab.

These interfaces options are communicated to the tab manager 131, which interfaces with the POS software at the venue on the POS devices 130 for processing the selected interface options by the user.

This provides a mechanism for users to control their tabs with venues. The user is no longer a passive participant but becomes an active participant that can control the tab and receive real time notifications of the tab.

In an embodiment, when something is placed on the tab through orders communicated to the waiter or through the interface by the users or members of the users' parties, the tab manager 131 sends a real time text or application notification to the user device 120.

This control is particularly useful for individuals that are responsible for a tab of a group of people, such as parties, where the members are disbursed and ordering at will. The tab control is also useful to quickly close out a tab so the user can exist the venue, which can be particular problematic in some venues.

The information returned to the user through the mobile device 120 may also include additional useful information to the user, such as a time that an order was placed. This allows the user to demonstrate to the waiter that the length of time it took to receive an order item was excessive. These metrics on the time the order was placed and when filled may also be maintained by the tab manager 131 and used internally within the venue for evaluating the efficiencies of the entire venue with respect to certain days of the week, certain traffic volume of customers, certain times of the day, and the like. So, the metrics can be useful to the user in real time and also useful to the venue for efficient operation of the venue.

Interaction for processing the options of the user through the interface can be an Application Programming Interface between the tab manager 131 and the POS transaction and ordering software services. The interface for the user can be an API that monitors and responses to texts or as stated before a Web-based set of browser pages for the user to interact with the tab manager 131. Also, the API may be between a mobile application on device 120 and the tab manager 131.

In an embodiment, preset notifications for the tab manager 131 are set for a user. The user can change these settings through interaction with the tab manager (mobile application, web browser, and/or texts).

In an embodiment, the tab manager 131 also permits user registration through the interface for venue loyalty points, advertisements, registration of payment methods, and the like.

In an embodiment, the tab manager 131 links an open tab once the user identity is known, such as after a tab is opened and the waiter obtains loyalty information for the order associated with the tab.

In an embodiment, the tab manager 131 links an open tab when the tab is paid and closed based on a payment method being associated with the customer.

In an embodiment, the tab manager 131 links the open tab with the user based on the phone number that is known for the customer and used by the customer as the device 120.

In an embodiment, the tab manager 131 creates an anonymous customer account for access to the tab manager 131 based on the customer's phone number for communication with the tab manager 131. In this way, when the customer returns the tab manager 131 has previous tabs (accessible through the API between the tab manager 131 and the POS ordering and transaction software) and can retain preference settings for the customer even when the identity of the customer is unknown.

In an embodiment, the tab manager 131 can provide interfaces options for the customer to view through the mobile device 120 a previous tab history for the customer. In an embodiment, the tab manger includes interface options for the customer to select and automatically order from selected items of the history.

In an embodiment, the user through any user-operated device 120 registers through a website or mobile application with the system 100 and include in the registration particulars of the user and user-operated device identifiers (phone numbers) along with, optionally, payment methods of the user, such as credit card, PayPal® accounts, and others. This permits for automatic recognition of the user through the user-operated device 120, allows for history to be maintained for tab-based orders, allows for automatic payment of bills associated with open orders tied to unique tab numbers and tabs maintained by the user with the venue, loyalty rewards from the venue and/or the system 100, and delivering of target marketing to the user.

In an embodiment, the communication between the user-operated device 120 and the tab manager 131 can occur through one or more of: a mobile application executing on the device 120, SMS texting, other messaging-based systems besides SMS texting (such as social media: FaceBook®, Instagram®, Twitter®, Slack®, and others), and/or automated chat bots that are responsive to user interactions within a particular messaging platform or capable of integrating user interaction from a first messaging platform type across one or more other disparate messaging platform types or integrate user interaction over a messaging platform with back end and external service associated with the system 100.

In an embodiment, the POS ordering and transaction software sends a notification to the tab manager 131 when each new item that is placed on an open order to which the unique tab number is associated as one mechanism for integrating the tab manager 131 with the POS ordering and transaction software.

In an embodiment, an automated chat bot (as described in a previous embodiment above) is a front-end interface to the tab manager 131. The user operating the device 120 interacts with the chat bot to control the open order associated with the user and the unique tab number. The chat bot is accessed by the user through any user-selected messaging platform interface. The chat bot translates interaction between the messaging platform and an API associated with the tab manager 131 and responses from the tab manager API back to the user-selected messaging platform being used by the user on the device 120.

The embodiments presented in the FIG. 1 and other embodiments are now discussed with reference to the FIGS. 2-4.

Figure 2:
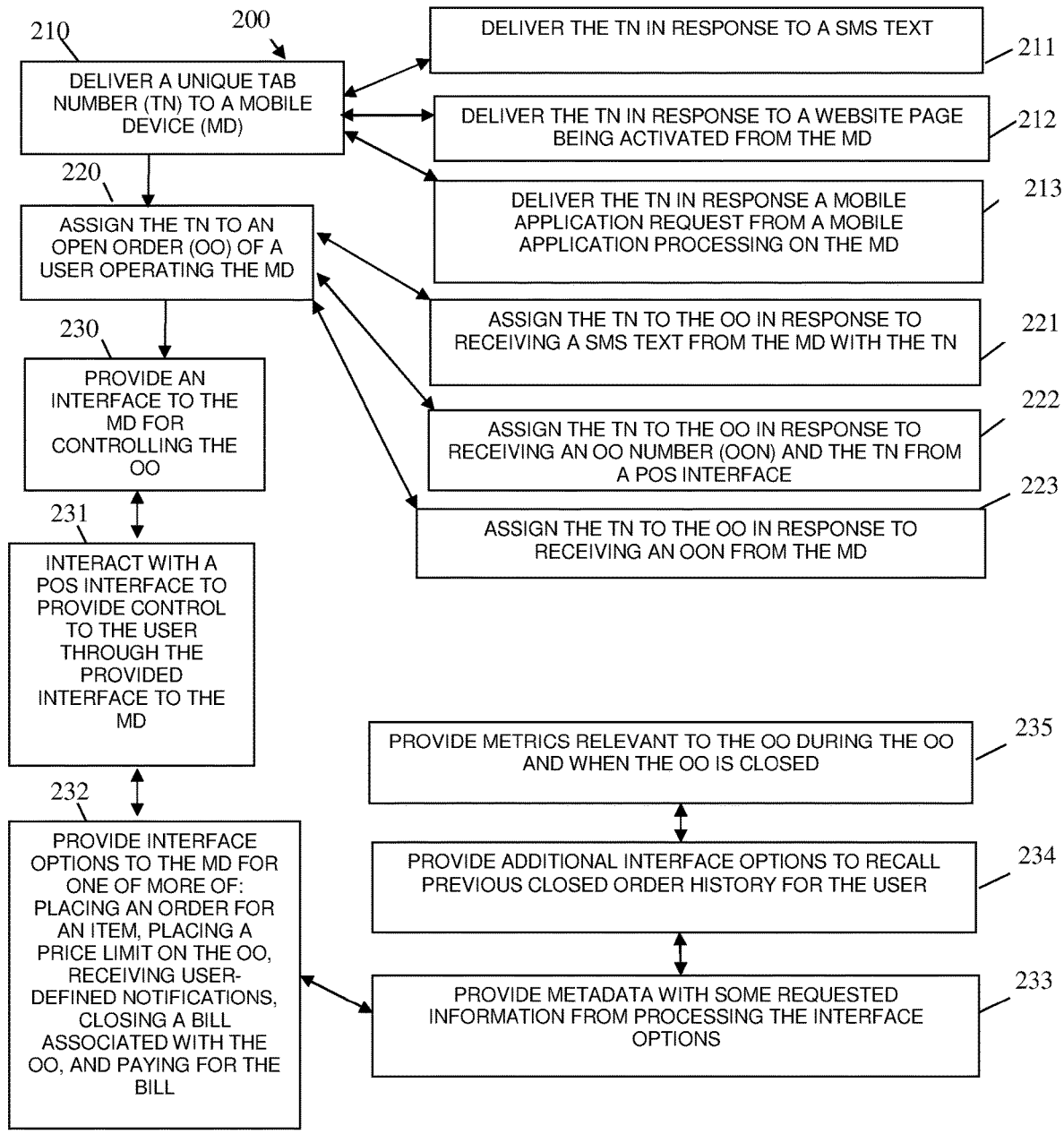
FIG. 2 is a diagram of a method for providing bi-directional real-time tab control, according to an example embodiment.

FIG. 2 is a diagram of a method 200 for providing bi-directional real-time tab control, according to an example embodiment. The software module(s) that implements the method 200 is referred to as a "tab manager." The tab manager is implemented as executable instructions programmed and residing within memory and/or a non-transitory computer-readable (processor-readable) storage medium and executed by one or more hardware processors of a hardware computing device. The processors of the device that executes the tab manager are specifically configured and programmed to process the tab manager. The tab manager has access to one or more networks during its processing. The networks can be wired, wireless, or a combination of wired and wireless.

In an embodiment, the device that executes the tab manager is any of the POS devices 110.

In an embodiment, the device that executes the tab manager is a cloud computing environment.

In an embodiment, the device that executes the tab manager is a server.

In an embodiment, the tab manager is all of or some combination of the tab generator 110 and the tab manager 131.

At 210, the tab manager delivers a unique tan number to a mobile device being operated by a user at an establishment.

According to an embodiment, at 211, the tab manager delivers the unique tab number in response to receiving an SMS text message.

In an embodiment, at 212, the tab manager delivers the unique tab number in response to a website page being activated from the mobile device, such as when the mobile device is operated to scan a QR code.

In an embodiment, at 213, the tab manager delivers the unique tab number in response to a mobile application request from a mobile application processing on the mobile device.

At 220, the tab manager assigns the unique tab number to an open order of a user that is operating the mobile device.

In an embodiment, at 221, the tab manager assigns the unique text number to the open order in response to receiving an SMS text message from the mobile device with the unique text number.

In an embodiment, at 222, the tab manager assigns the unique text number to an open order in response to receiving an open order number and the unique tab number from a POS interface.

In an embodiment, at 223, the tab manager assigns the unique text number to the open order in response to receiving an open order number from the mobile device.

At 230, the tab manager provides an interface to the mobile device for bi-directionally controlling the open order in real time.

According to an embodiment, at 231, the tab manager interacts with a POS interface to provide control to the user through the provided interface to the mobile device.

In an embodiment of 231 and at 232, the tab manager provides interface options to the mobile device for one or more of: placing an order for an item, placing a price limit on the open order, receiving user-defined notification, closing a bill associated with the open order, and paying for the open order.

In an embodiment of 232 and at 233, the tab manager provides metadata with some requested information from processing the interface options (such as time a specific item was ordered with the open order, and the like).

In an embodiment of 233 and at 234, the tab manager provides additional interface options to recall previous closed order history for the user.

In an embodiment of 234 and at 235, the tab manager provides metrics relevant to the open order during the open order and when the open order is closed.

Figure 3:
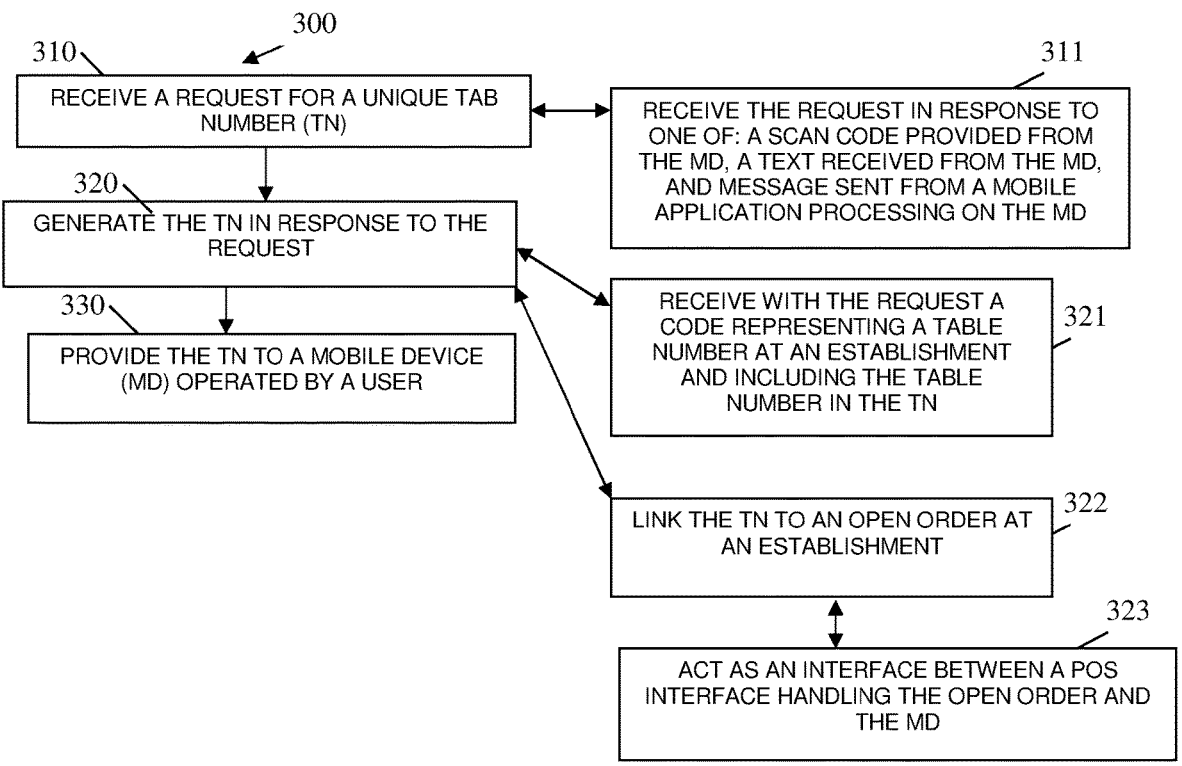
FIG. 3 is a diagram of another method for providing bi-directional real-time tab control, according to an example embodiment.

FIG. 3 is a diagram of another method providing bi-directional real-time tab control, according to an example embodiment, according to an example embodiment. The software module(s) that implements the method 300 is referred to as a "tab generator." The tab generator is implemented as executable instructions programmed and residing within memory and/or a non-transitory computer-readable (processor-readable) storage medium and executed by one or more hardware processors of a hardware device. The processors of the device that executes the tab generator are specifically configured and programmed to process the tab generator. The tab generator has access to one or more networks during its processing. The networks can be wired, wireless, or a combination of wired and wireless.

The tab generator presents another and in some ways enhanced perspective of the method 200.

In an embodiment, the tab generator is the transaction generator 110.

In an embodiment, the device that executes the tab generator is any of the POS devices 110.

In an embodiment, the device that executes the tab generator is a cloud computing device.

In an embodiment, the device that executes the tab generator is a server.

At 310, the tab generator receives a request for a unique tab number.

According to an embodiment, at 311, the tab generator receives the request in response to one of: a scan code provided from the mobile device, a SMS text message received from the mobile device, and message sent from a mobile application processing on the mobile device.

At 320, the tab generator generates the unique tab number in response to the request.

In an embodiment, at 321, the tab generator receives with the request a code representing a table number at an establishment and including the table number in the unique text number.

In an embodiment, at 322, the tab generator links the unique text number to an open order at an establishment.

In an embodiment of 322 and at 323, the tab generator act as an interface between a POS interface handling the open order and the mobile device.

At 330, the tab generator provides the unique tab number to a mobile device operated by a user for the user to control the open order in real time via interfaces provided to the mobile device.

Figure 4:
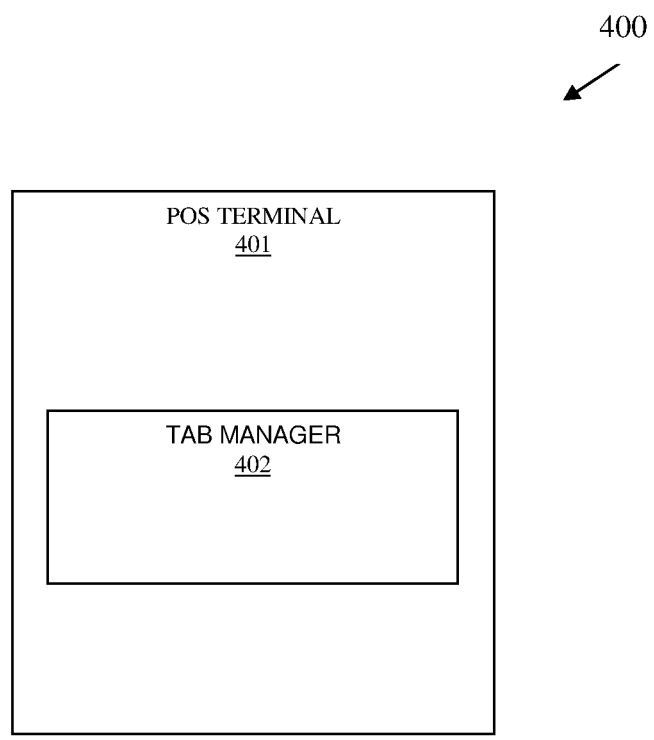
FIG. 4 is a diagram of another system for bi-directional real-time tab control, according to an example embodiment.

FIG. 4 is a diagram of another system 400 for bi-directional real-time tab control, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all or some combination of the processing discussed above with the FIGS. 1-3.

In an embodiment, the system 400 implements, inter alia, the method 200 of the FIG. 2.

In an embodiment, the system 400 implements, inter alia, the method 300 of the FIG. 3.

The system 400 includes a POS terminal 401 and the POS terminal 401 including a tab manager 402.

The tab manager 402 is configured to: 1) execute on at least one hardware processor of the server 401; 2) assign unique tab numbers to mobile devices operated by users; 3) link each unique tab number to a specific open order associated with a specific user, and 4) provide an interface to the mobile devices for bi-directionally controlling the open orders.

In an embodiment, the tab manager 403 is further configured to: 6) provide at least one interface option to: split items on a particular open order to a different or a newly created open order and transfer the particular open order to a different open order.

In an embodiment, the tab manager 403 is further configured to: 5) interact in real time and act as an intermediary between the interface and a POS ordering and transaction interface of the POS terminal 401.

In an embodiment, the tab manager 402 is the tab manager 131.

In an embodiment, the tab manager 402 is the method 200.

In an embodiment, the tab manager 402 performs some or all of the processing of the tab generator 110 and the method 300.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   receiving, by executable instructions that reside in a non-transitory computer-readable storage medium and are executed by a hardware processor of a server, a request for a unique tab number, wherein a mobile device of a user requests the unique tab number by making a connection to the server when scanning a code;
   generating, by the executable instructions, the unique tab number in response to the request;
   providing, by the executable instructions, the unique tab number to the mobile device operated by the user;
   obtaining, by the executable instructions, the unique tab number that is texted back from the mobile device by the user and opening an open order linked to the unique tab number and the mobile device of the user;
   interacting, by the executable instructions, with the mobile device through an automated chat bot that processes on a messaging platform and using the automated chat bot as a front-end interface to the method, wherein the mobile device interacts with the automated chat bot over the messaging platform, and controlling delivery of real-time information and real-time changes made to the open order linked to the unique tab number through the interacting with the automated chat bot, wherein a user associated with the open order operates mobile device and interacts with the automated chat bot over the messaging platform using the unique tab number and the automated chat bot controls the open order through interactions with the method allowing the user to be an active participant during the open order through the automated chat bot with real-time bi-directional control of the open order, and wherein the user initially engages the automated chat bot through the messaging platform and the messaging platform selected by the user through any user-selected messaging platform interface available to the user from the mobile device, wherein interacting further includes receiving from the automated chat bot a user-defined percent for reaching a tab limit set for the open order that when reached causes a user-defined notification to be provided to the automated chat bot and to the user, and wherein interacting further includes receiving from the automated chat bot a user-selected item from a history of selected items previous ordered by the user and adding the user-selected item to the open order on behalf of the user;
   receiving, by the executable instructions, commands that are translated by the chat bot during the interactions with the user;
   associating, by the executable instructions, a payment method with the user;
   providing, by the executable instructions, the commands to be processed by a Point-Of-Sale (POS) terminal causing the tab limit to be set for the open order, causing the unique tab number to be transferred to a different unique tab number associated with a different open order when identified by the user during the interactions, causing notifications to be set for closing the tab at a predefined time as defined by the user during the interactions, causing details for the open order to be provided back to the chat bot for delivery to the user during the interactions, causing the user-defined notification to be sent to the user through the automated chat bot when the user-defined percentage of the tab limit is reached, and causing a tab total to be paid for the open order based on the payment information associated with the user; and maintaining, by the executable instructions, an anonymous customer account for the user based on a phone number associated with the mobile device, wherein maintaining further includes maintaining preference settings for the user without retaining an identity for the user and recalling the preference settings during subsequent tabs associated with the user by using the preference settings associated with the phone number.

2. The method of claim 1, wherein generating further includes receiving with the request a code representing a table number at an establishment and including the table number in the unique tab number.

3. The method of claim 1, wherein generating further includes linking the unique tab number to the open order at an establishment.

4. The method of claim 3, wherein linking further includes acting as an interface between the POS terminal handling the open order and the mobile device.

* * * * *